US010502264B1

(12) United States Patent
Pathuvoth et al.

(10) Patent No.: US 10,502,264 B1
(45) Date of Patent: Dec. 10, 2019

(54) BALL PLUG RETENTION FOR SLEWING RING BEARING

(71) Applicant: General Electric Company, Schenectady, NY (US)

(72) Inventors: Dhanesh Chandrashekar Pathuvoth, Bangalore (IN); Adam Daniel Minadeo, Greenville, SC (US); William Max Gobeli, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/108,480

(22) Filed: Aug. 22, 2018

(51) Int. Cl.
*F16C 33/58* (2006.01)
*F16C 19/18* (2006.01)
*F16C 43/06* (2006.01)
*F03D 80/70* (2016.01)

(52) U.S. Cl.
CPC ............ *F16C 33/581* (2013.01); *F03D 80/70* (2016.05); *F16C 19/18* (2013.01); *F16C 33/583* (2013.01); *F16C 43/06* (2013.01); *F16C 2300/14* (2013.01)

(58) Field of Classification Search
CPC ...... F16C 33/583; F16C 43/06; F16C 33/581; F16C 19/18; F16C 2300/14; F03D 80/70
See application file for complete search history.

(56) References Cited

U.S. PATENT DOCUMENTS 3,275,391 A * 9/1966 Blais ..................... F16C 19/362
384/447
3,785,023 A * 1/1974 Harbottle ................ F16C 19/54
29/407.05
3,830,633 A * 8/1974 Harbottle ................ F16C 19/54
29/724
3,948,578 A * 4/1976 Martin ..................... F16C 19/38
384/582
3,989,315 A * 11/1976 Murdoch ................ E21B 10/22
384/96
4,606,654 A * 8/1986 Yatsu ...................... F16C 43/06
384/447
4,906,113 A    3/1990 Sague
4,961,653 A * 10/1990 Suzuki .................. F16C 19/362
384/447

(Continued)

FOREIGN PATENT DOCUMENTS

DE           19837579 A1      2/2000
EP             811777 A1  *  12/1997

OTHER PUBLICATIONS

Machine Translation of EP 811777 (Year: 1997).*

*Primary Examiner* — Alan B Waits
(74) *Attorney, Agent, or Firm* — Dority & Manning, P.A.

(57) ABSTRACT

A bearing assembly for a wind turbine includes a bearing comprising an outer race, an inner race rotatable relative to the outer race, and a plurality of roller elements positioned within at least one raceway defined between the outer and inner races. Further, at least one of the outer race or the inner race defines a radial opening. The bearing assembly also includes at least one ball plug positioned within the radial opening of at least one of the outer race or the inner race. The ball plug(s) is removable such that the plurality of roller elements can be inserted between the outer and inner races. Moreover, at least a portion of the ball plug(s) has a tapered cross-section.

10 Claims, 9 Drawing Sheets

(56) References Cited

U.S. PATENT DOCUMENTS

| | | | | |
|---|---|---|---|---|
| 5,026,177 | A * | 6/1991 | Masuda | F16C 19/362 |
| | | | | 384/447 |
| 5,097,565 | A * | 3/1992 | Shorey | B60B 33/0002 |
| | | | | 16/20 |
| 5,104,239 | A * | 4/1992 | Sague | F16C 19/38 |
| | | | | 29/898.01 |
| 5,134,863 | A * | 8/1992 | Hanna | D04B 9/14 |
| | | | | 384/607 |
| 5,520,257 | A * | 5/1996 | Crews | E21B 10/10 |
| | | | | 175/227 |
| 6,196,339 | B1 * | 3/2001 | Portwood | E21B 10/25 |
| | | | | 175/227 |
| 8,753,015 | B2 * | 6/2014 | Kuo | F16C 19/362 |
| | | | | 384/447 |
| 9,188,154 | B2 * | 11/2015 | Magny | F16C 19/38 |
| 9,255,607 | B2 | 2/2016 | Bouron et al. | |
| 9,488,224 | B1 * | 11/2016 | Castro | F16C 33/6622 |
| 9,638,259 | B2 * | 5/2017 | Bredoire | F16C 19/26 |
| 2005/0135720 | A1 * | 6/2005 | Ohno | F16C 19/362 |
| | | | | 384/559 |
| 2010/0230170 | A1 * | 9/2010 | Crawford | E21B 10/24 |
| | | | | 175/227 |
| 2013/0223783 | A1 * | 8/2013 | Kikuchi | F16C 33/30 |
| | | | | 384/569 |

\* cited by examiner

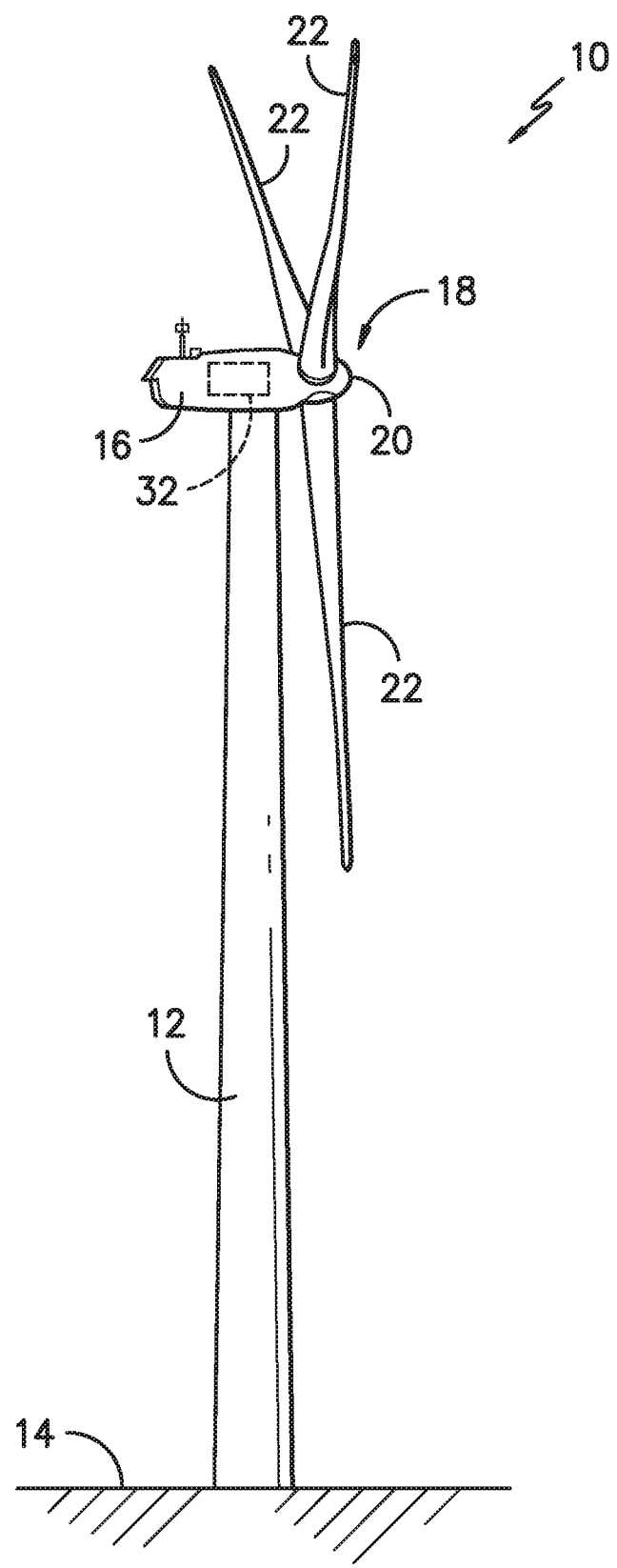
FIG. -1-

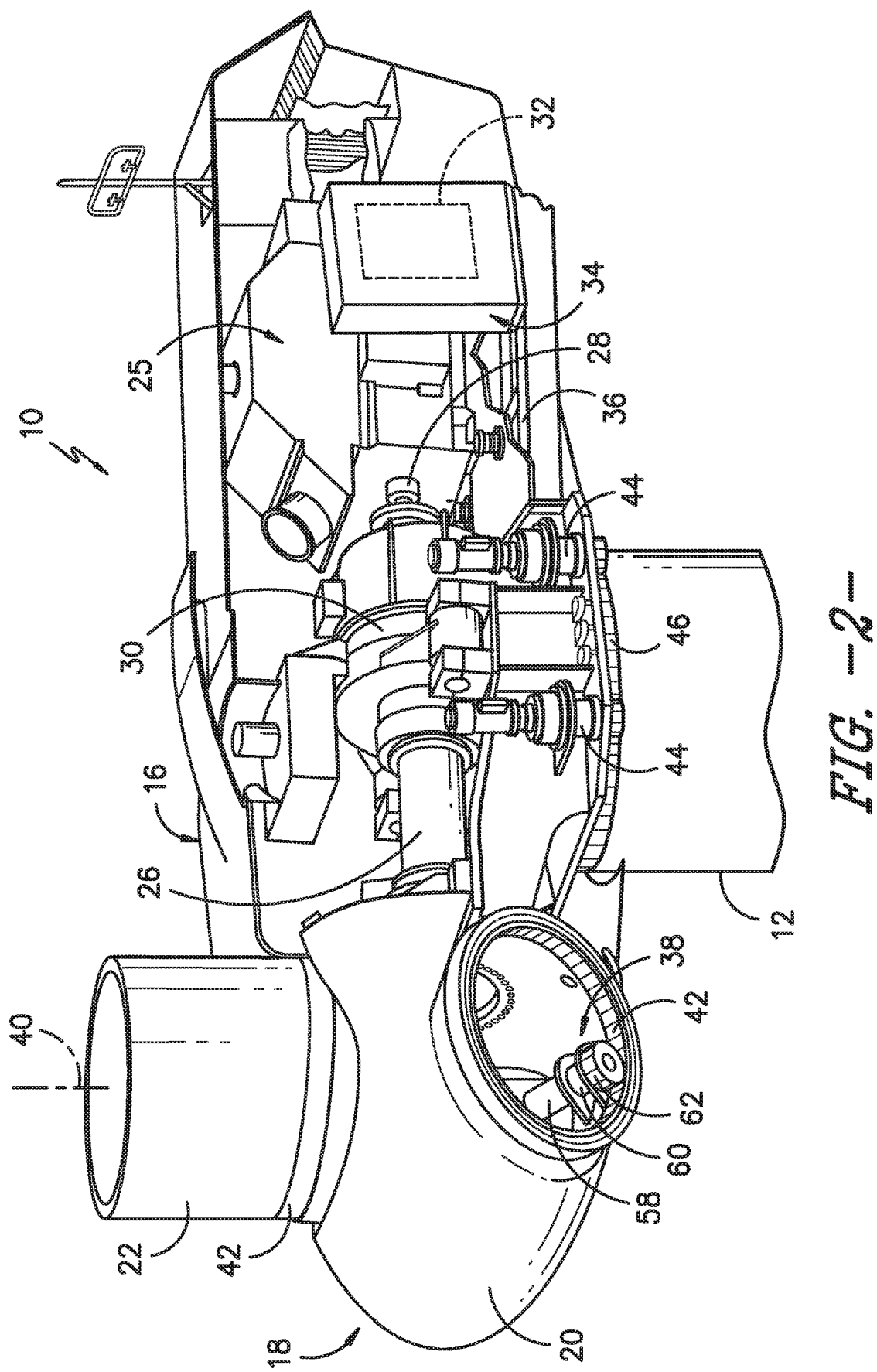
FIG. -2-

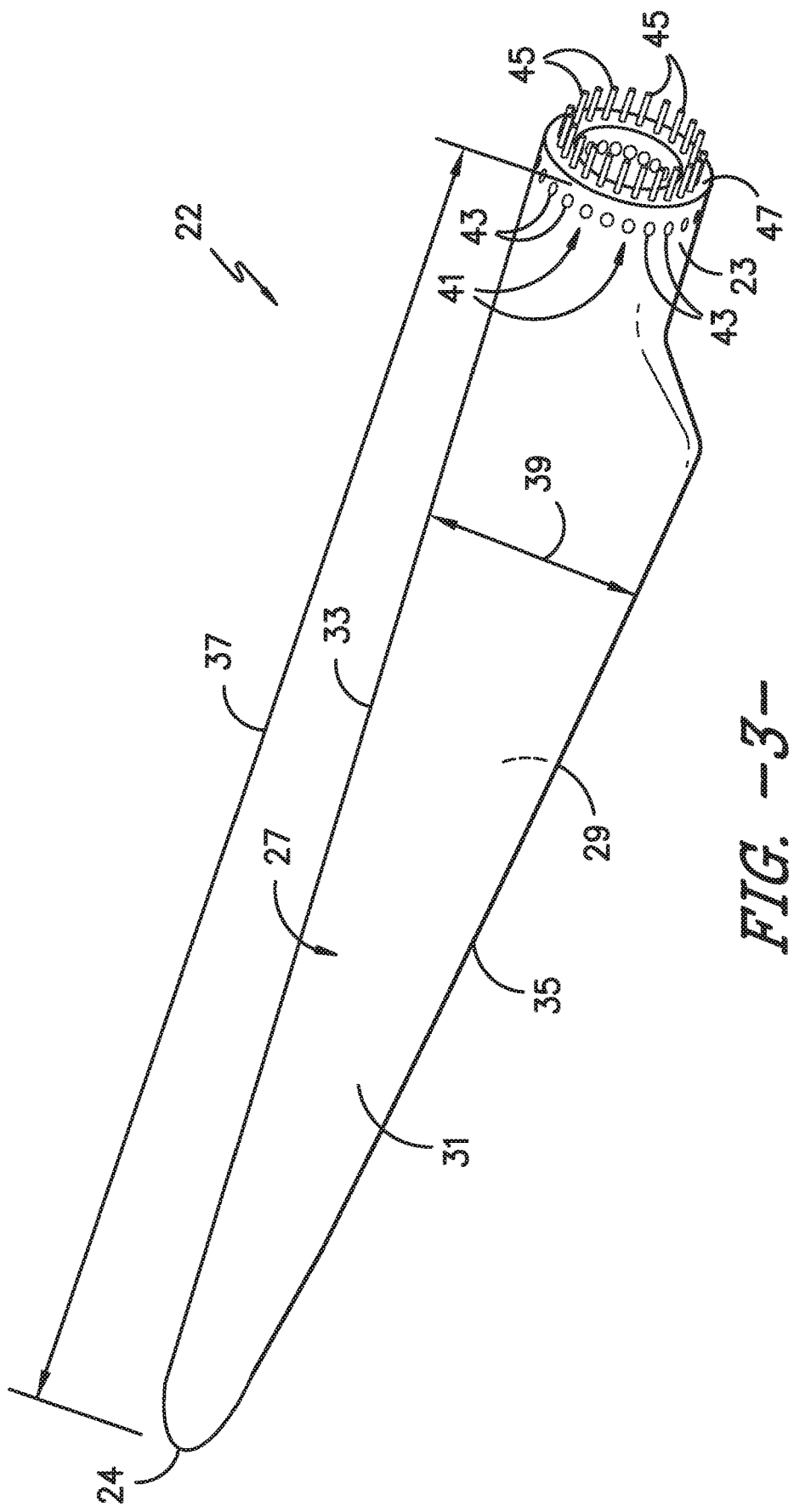
FIG. -3-

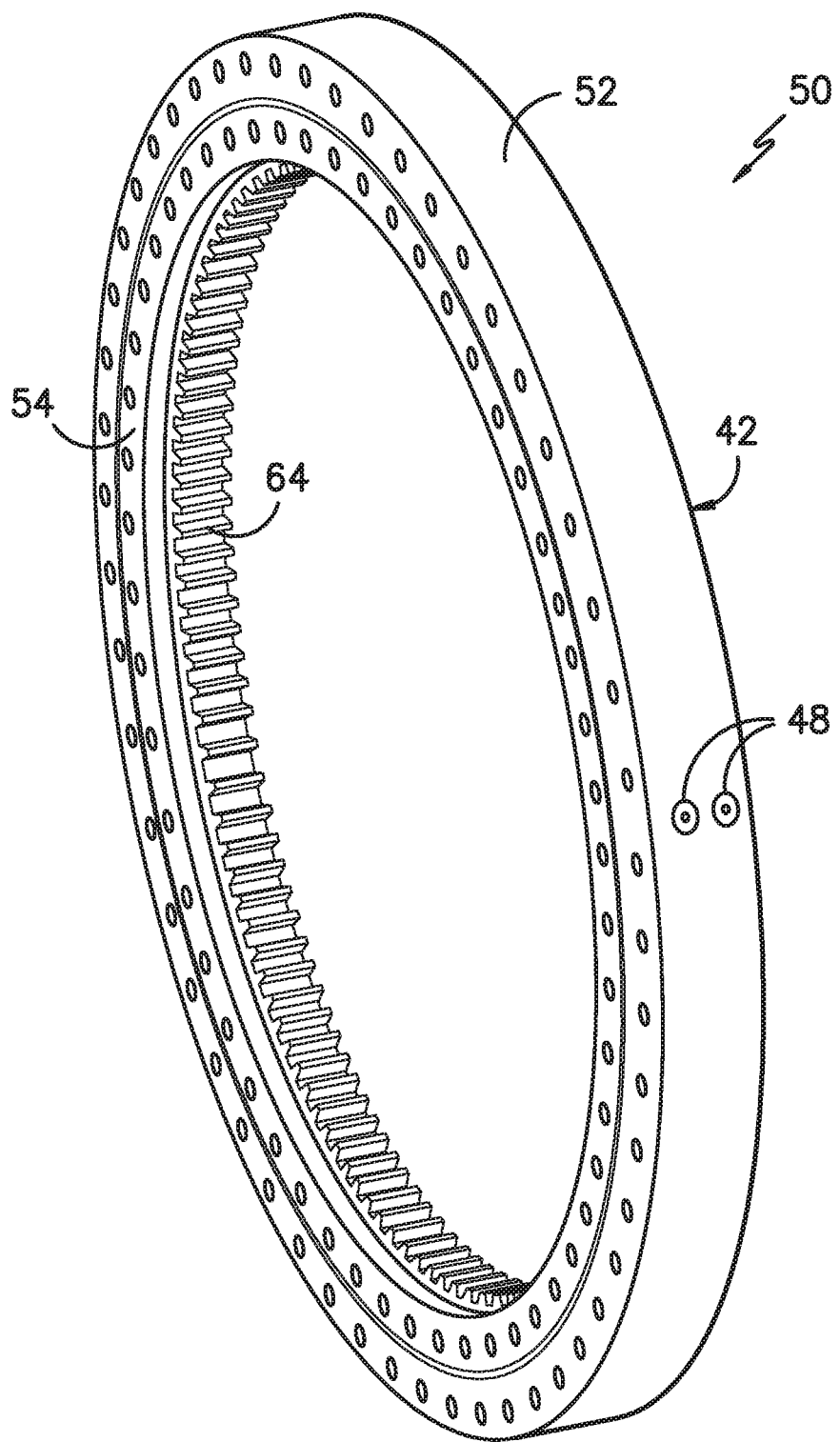
FIG. -4-

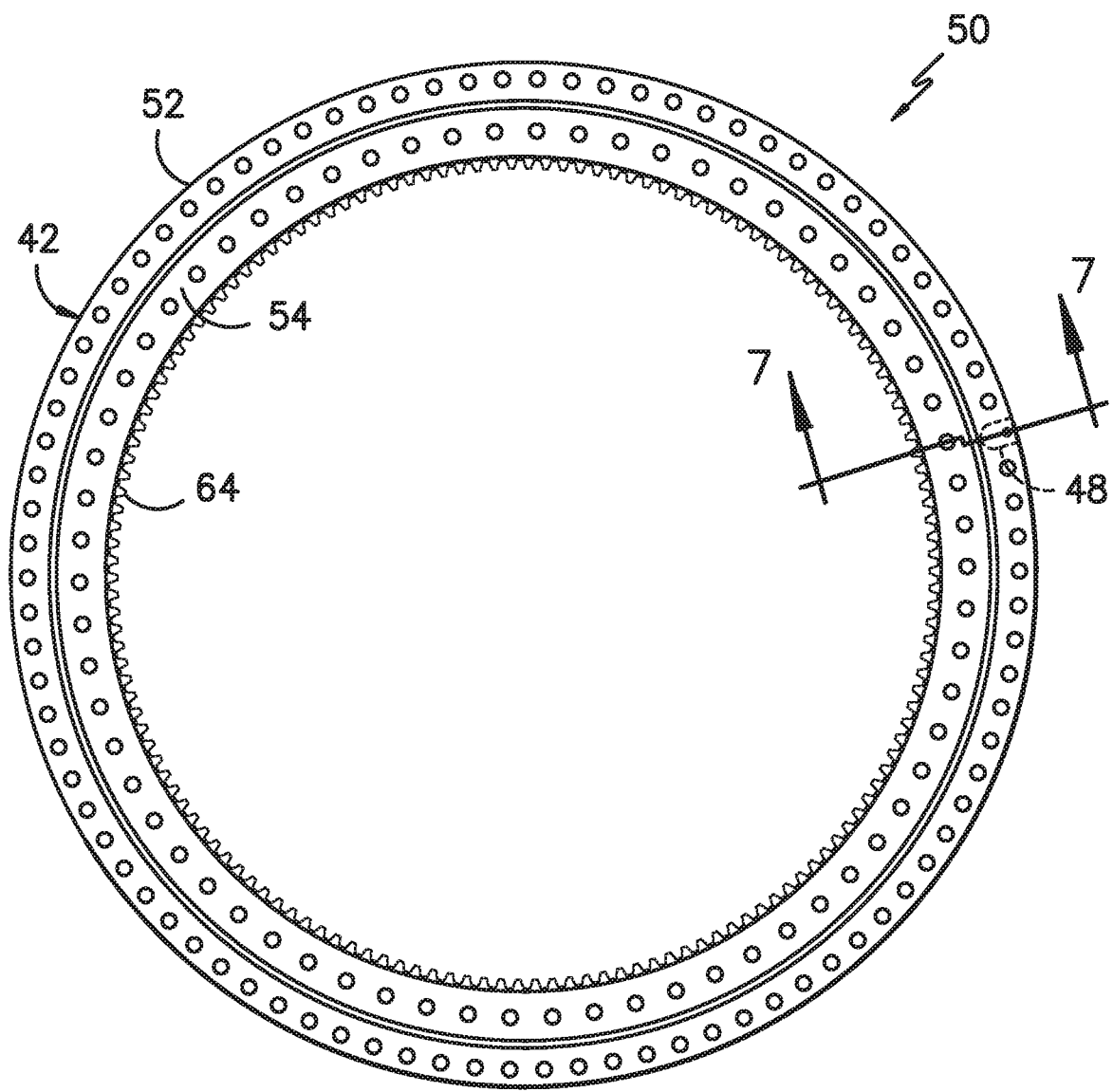
FIG. -5-

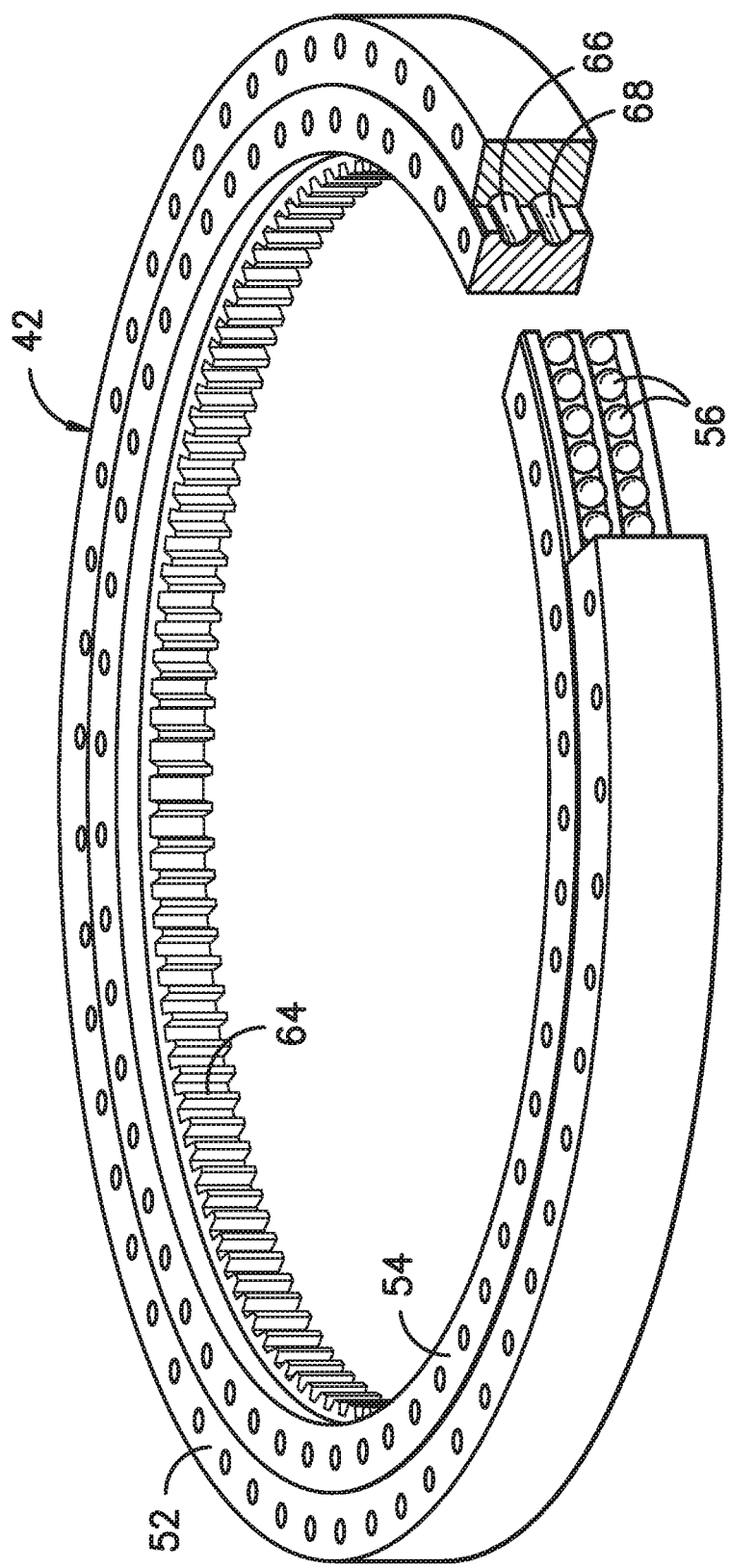
FIG. -6-

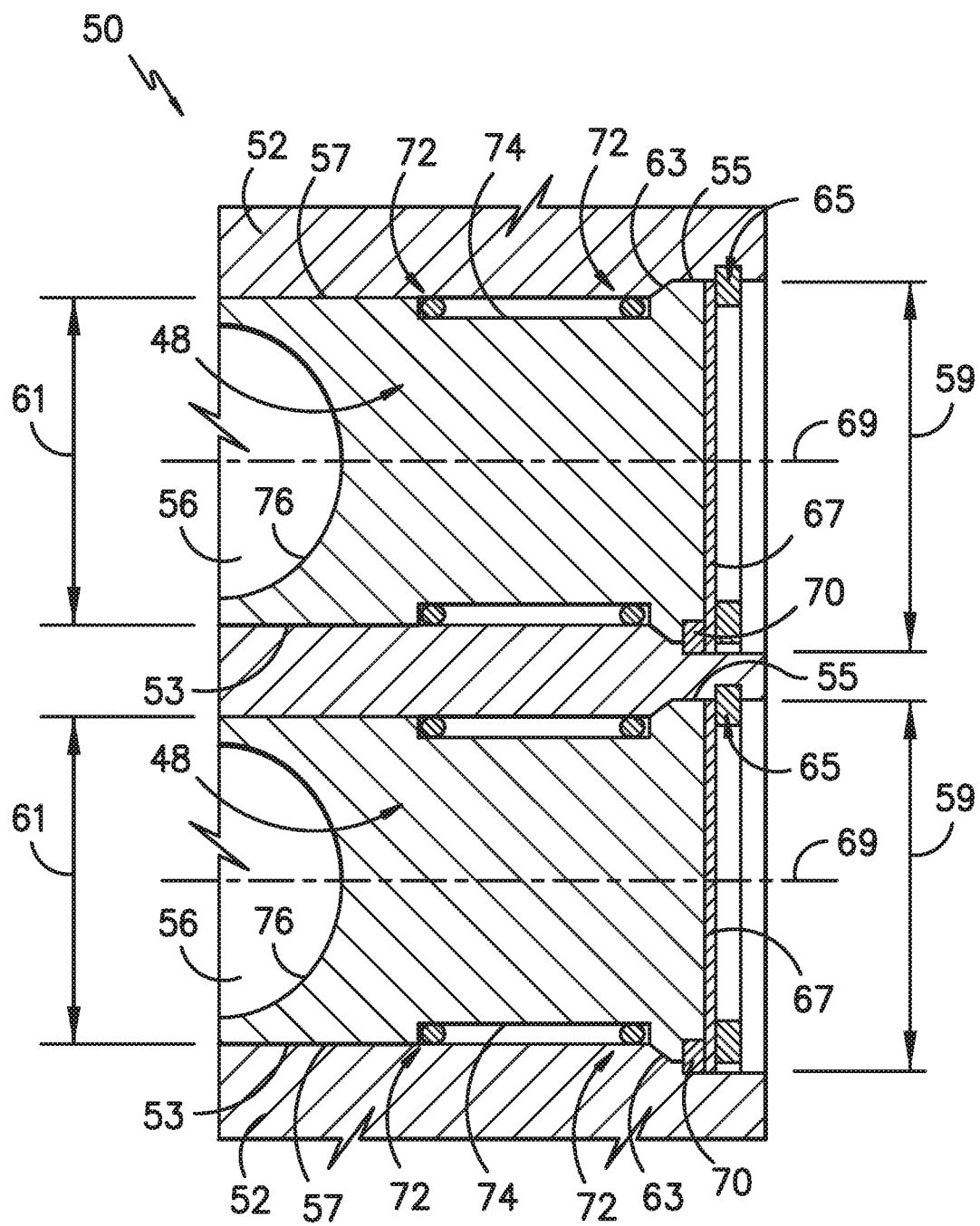
FIG. -7-

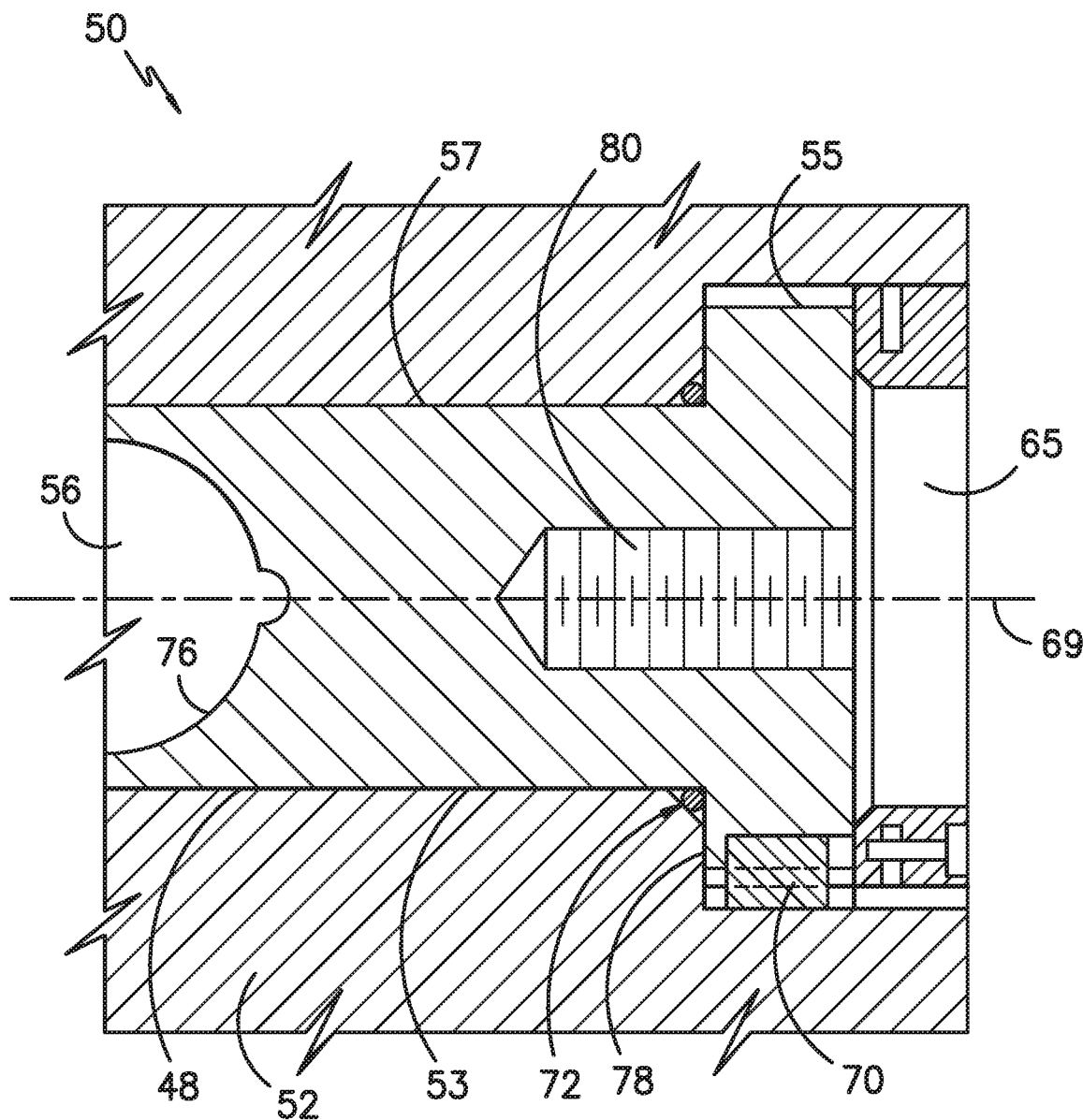
FIG. -8-

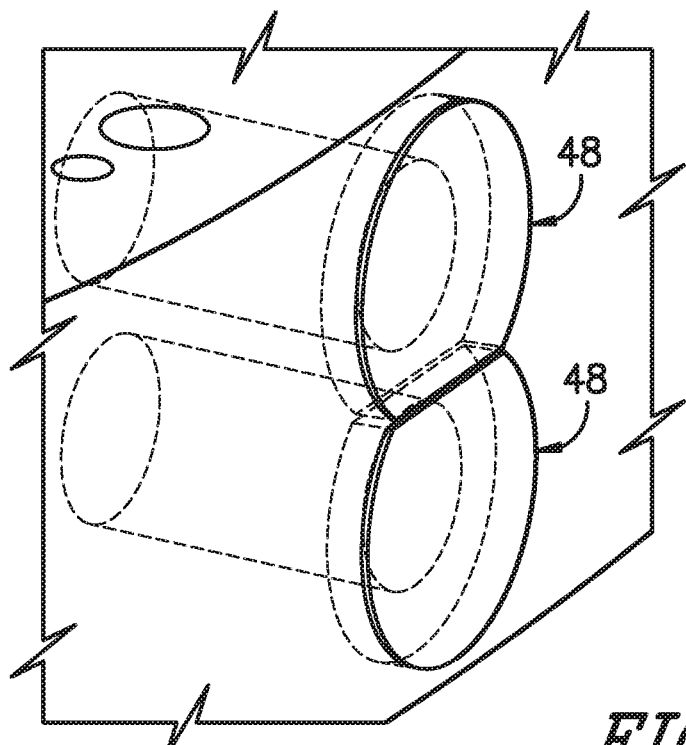
FIG. -9-
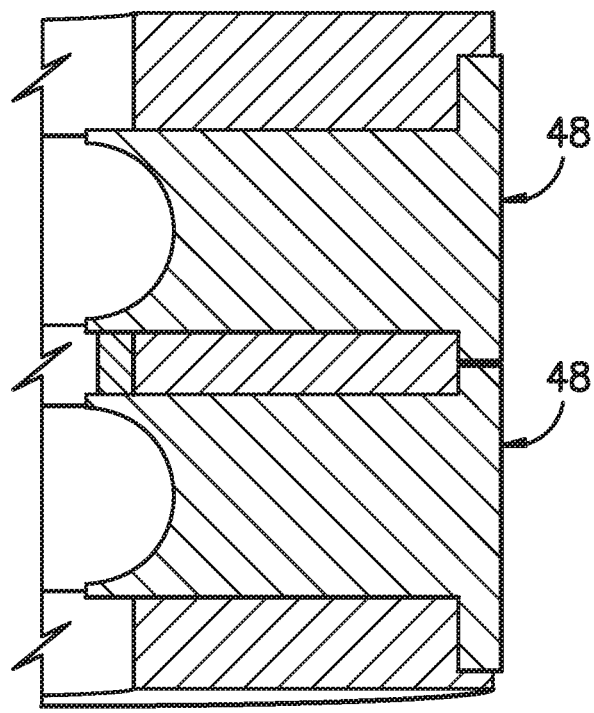
FIG. -10-

US 10,502,264 B1

BALL PLUG RETENTION FOR SLEWING RING BEARING

FIELD

The present subject matter relates generally to wind turbines and, more particularly, to ball plug retention for a slewing ring bearing (such as a pitch or yaw bearing of a wind turbine).

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. The yaw and/or pitch bearings are typically slewing bearings which are rotational roller-element bearings that typically support a heavy but slow-turning or slow-oscillating load. As such, yaw bearings permit rotation of the nacelle and are mounted between the tower and the nacelle, whereas pitch bearings permit rotation of the rotor blades and are mounted between the rotatable hub and one of the rotor blades. Typical yaw and/or pitch bearings include an outer and inner race with a plurality of roller elements (e.g. ball bearings) configured between the races.

More specifically, four-point slewing ring bearings have ball plugs that can be removed such that the roller elements can be easily inserted between the races. Currently, one or more taper pins are used in conventional balls plug to help maintain the radial seating of the plug. For example, one or more taper pins may be inserted through the ball plug(s), i.e. in a direction generally perpendicular to a longitudinal axis of the ball plug(s). At times, the taper pin(s) can cause areas of increased stress concentration.

Accordingly, the art is continuously seeking new and improved systems and methods for ball plug retention for a slewing ring bearing (such as a pitch or yaw bearing of a wind turbine).

BRIEF DESCRIPTION

Aspects and advantages of the disclosure will be set forth in part in the following description, or may be obvious from the description, or may be learned through practice of the disclosure.

In one aspect, the present subject matter is directed to a bearing assembly for a wind turbine. The bearing assembly includes a bearing comprising an outer race, an inner race rotatable relative to the outer race, and a plurality of roller elements positioned within at least one raceway defined between the outer and inner races. Further, at least one of the outer race or the inner race defines a radial opening. The bearing assembly also includes at least one ball plug positioned within the radial opening of at least one of the outer race or the inner race. The ball plug(s) is removable such that the plurality of roller elements can be inserted between the outer and inner races. Moreover, at least a portion of the ball plug(s) has a tapered cross-section.

In one embodiment, the tapered cross-section may be positioned between an outer portion and an inner portion of the ball plug(s) so as to define a transitional region thereof. In another embodiment, the outer portion may define a first diameter and the inner portion may define a second diameter, with the first diameter tapering to the second diameter in the transitional region.

In further embodiments, the bearing assembly may also include exterior retention means arranged at or adjacent to a distal-most end of the outer portion of the ball plug(s). In such embodiments, the exterior retention means may include, for example, a circlip, a snap ring, a clamp, bonding means, or similar. More specifically, in one embodiment, the bonding means may include welding, adhesives, or chemical-based solvents.

In additional embodiments, the bearing assembly may also include a spacer or shim positioned between the exterior retention device and the distal-most end of the outer portion of the at least one ball plug.

In several embodiments, the bearing assembly may include an anti-rotation device extending perpendicular to a longitudinal axis of the ball plug(s) and engaging an outer surface of the transitional region of the ball plug(s) so as to prevent rotation thereof.

In particular embodiments, the bearing assembly may include one or more O-rings arranged circumferentially around the inner portion of the ball plug(s). For example, in one embodiment, the inner portion of the ball plug(s) may include at least one annular recess, with the one or more O-rings being arranged within the at least one annular recess. In another embodiment, the bearing assembly may include a plurality of O-rings arranged circumferentially around the inner portion of the ball plug(s) within the at least one annular recess. In such embodiments, the plurality of O-rings may be aligned in a longitudinal direction of the ball plug(s).

In yet another embodiment, the inner portion of the ball plug(s) may include a partial raceway that defines a portion of at least one raceway of either the outer race or the inner race, the partial raceway arranged on the inner portion of the ball plug(s).

In further embodiments, the bearing may include a pitch bearing or a yaw bearing of a wind turbine. In additional embodiments, the plurality of roller elements may include, for example, a ball, a sphere, a roller, a tapered roller, a barrel-shaped roller, or a cylindrical element.

In another aspect, the present subject matter is directed to a bearing assembly for a wind turbine. The bearing assembly includes a bearing includes an outer race, an inner race rotatable relative to the outer race, and a plurality of roller elements positioned within at least one raceway defined between the outer and inner races. Further, at least one of the outer race or the inner race defines a radial opening having a tapering diameter. Moreover, the bearing assembly includes at least one ball plug having an outer portion and an inner portion. The outer portion defines a first diameter and the inner portion defines a second diameter, with the first diameter being larger than the second diameter. The ball plug(s) is positioned within the radial opening of either the outer race or the inner race and is removable such that the plurality of roller elements can be inserted between the outer and inner races.

In one embodiment, the ball plug(s) may have a varying cross-section that substantially corresponds to the tapering diameter of the radial opening. Further, the varying cross-section of the ball plug(s) may be located between the outer and inner portions of the ball plug(s).

In another embodiment, the bearing assembly may include an exterior retention device arranged adjacent to a distal-most end of the outer portion of the ball plug(s). For example, in one embodiment, the exterior retention device may include a locknut or a retention plate and one or more mechanical fasteners that engage with the locknut or the retention plate and extend parallel with a longitudinal axis of the ball plug(s).

In yet another aspect, the present subject matter is directed to a bearing assembly for a wind turbine. The bearing assembly includes an outer race, an inner race rotatable relative to the outer race, and a plurality of roller elements positioned within at least one raceway defined between the outer and inner races. At least one of the outer race or the inner race defines a set of radial openings. The bearing assembly also includes a set of ball plugs each having an outer portion and an inner portion. The outer portion defines a first diameter and the inner portion defines a second diameter, with the first diameter being larger than the second diameter. Each of the ball plugs is positioned within one of the radial openings such that the outer portions thereof contact each other. Further, the set of ball plugs are removable such that the plurality of roller elements can be inserted between the outer and inner races.

It should be understood that the bearing assembly may further include any one of combination of the features and/or embodiments as described herein.

These and other features, aspects and advantages of the present disclosure will be further supported and described with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, internal view of one embodiment of a nacelle of the wind turbine shown in FIG. 1;

FIG. 3 illustrates a perspective view of one embodiment of one of the rotor blades of the wind turbine shown in FIG. 1;

FIG. 4 illustrates a perspective view of one embodiment of a pitch bearing of a wind turbine according to the present disclosure;

FIG. 5 illustrates a top view of one embodiment of a pitch bearing of a wind turbine according to the present disclosure;

FIG. 6 illustrates a partial, cut-away view of one embodiment of a pitch bearing of a wind turbine according to the present disclosure;

FIG. 7 illustrates a cross-sectional view of the pitch bearing of FIG. 5 along section line 7-7, particularly illustrating details of one embodiment of a ball plug according to the present disclosure; and FIG. 8 illustrates a cross-sectional view of another embodiment of a ball plug of a pitch bearing according to the present disclosure;

FIG. 9 illustrates a partial, perspective view of yet another embodiment of a set of ball plugs of a pitch bearing according to the present disclosure, particularly illustrating the set of ball plugs stacked together such that an anti-rotation feature is not needed; and FIG. 10 illustrates a cross-sectional view of the embodiment of FIG. 9.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present subject matter is directed to a bearing assembly for a wind turbine that eliminates conventional taper pins described herein. More specifically, a taper may be introduced in the bearing to retain the ball plug in the radial seating of the plug. In addition, to prevent the ball plug from rotating and being forced out of its radial seating, the ball plug may also be clamped with a circlip/snap ring on the outer race of the bearing.

Accordingly, the bearing assembly of the present disclosure provides numerous advantages not present in the cited art. For example, by eliminating the taper pin, the stress concentration created in the outer race due to the intersection of the taper pin hole and the plug hole is eliminated. As such, stresses and cracks can be reduced in the overall bearing assembly.

The present disclosure is described herein as it may relate to wind turbine bearings, including, at least, yaw bearings, pitch bearings, and/or similar. It should be appreciated, however, that the systems and methods in accordance with principles of the disclosure is not limited to use with a wind turbine, but is applicable to any suitable bearing application. For example, it should be understood that the systems and methods as described herein is configured to fit within conventional slewing bearings and/or modified slewing bearings known in the art and later developed and are not limited to a specific slewing bearing configuration.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Referring now to FIG. 2, a simplified, internal view of one embodiment of the nacelle 16 of the wind turbine 10 shown in FIG. 1 is illustrated. As shown, the generator 24 may be disposed within the nacelle 16 and supported atop a bedplate 36. In general, the generator 24 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 24 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 24.

The wind turbine 10 may also include a turbine controller 32 centralized within the nacelle 16. Further, as shown, the turbine controller 32 is housed within a control cabinet 34. Moreover, the turbine controller 32 may be communicatively coupled to any number of the components of the wind turbine 10 in order to control the operation of such components and/or implement various correction actions as described herein.

Referring back to FIG. 2, each rotor blade 22 may also include a pitch drive mechanism 38 configured to rotate each rotor blade 22 about its pitch axis 40 via a pitch bearing 42, thereby allowing the orientation of each blade 22 to be adjusted relative to the direction of the wind. Similarly, the wind turbine 10 may include one or more yaw drive mechanisms 44 communicatively coupled to the turbine controller 32, with each yaw drive mechanism(s) 44 being configured to change the angle of the nacelle 16 relative to the wind (e.g., by engaging a yaw bearing 46 of the wind turbine 10).

Referring now to FIG. 3, a perspective view of one of the rotor blades 22 shown in FIGS. 1 and 2 is illustrated in accordance with aspects of the present subject matter. As shown, the rotor blade 22 includes a blade root 23 configured for mounting the rotor blade 22 to the hub 20 and a blade tip 23 disposed opposite the blade root 23. A body 27 of the rotor blade 22 may extend lengthwise between the blade root 23 and the blade tip 24 and may generally serve as the outer shell of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 24 and a chord 39 defining the total length of the body 27 between the leading edge 33 and the trailing edge 35. As is generally understood, the chord 39 may vary in length with respect to the span 37 as the body 27 extends from the blade root 23 to the blade tip 24.

Moreover, as shown, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via one of the pitch bearings 42), as will be described in greater detail below.

Referring now to FIGS. 4-8, various views of an embodiment of a bearing assembly 50 according to the present disclosure is illustrated. More specifically, as shown, the bearing assembly 50 includes a pitch bearing 42. It should be understood that the present disclosure is described with respect to a pitch bearing, but other bearing applications are within the spirit and scope of the disclosure, e.g. such as a yaw bearing. As shown, the pitch bearing 42 has outer race 52, inner bearing race 54, and a plurality of roller elements 56 disposed between the races 52, 54. As is generally understood, the outer race 52 may generally be configured to be mounted to a hub flange of the hub 20 using a plurality of hub bolts and/or other suitable fastening mechanisms. Similarly, the inner race 54 may be configured to be mounted to the blade root 23 using the root bolts 45 of the root attachment assemblies 41.

Further, the roller elements 56 as described herein may include any one of or combination of the following: one or more balls, spheres, rollers, tapered rollers, barrel-shaped rollers, cylindrical elements, or any other suitable roller elements. In addition, any suitable number of roller elements 56 may be employed. Further, the roller elements 56 may be arranged in any suitable configuration. For example, as shown in FIG. 6, two rows of roller elements 56 are employed, wherein each of the roller elements 56 is circumferentially spaced between the outer and inner races 52, 54. In still further embodiments, a single row or multiple, axially-spaced rows of roller elements 56 may be utilized in the bearing assembly 50 to provide additional strength. For example, in various embodiments, three or more rows of roller elements 56 may be employed.

Referring particularly to FIG. 6, the roller elements 56 are configured to be received within separate raceways defined between the inner and outer races 52, 54. Specifically, a first raceway 66 may be defined between the inner and outer races 52, 54 for receiving a first row of roller elements 56 and a second raceway 68 may be defined between the inner and outer races 52, 54 for receiving the second row of roller elements 56. Thus, as shown in FIGS. 4, 5, 7, and 8, the outer race 52 of the pitch bearing 42 may also include at least one ball plug 48 for allowing the roller elements 56 to be placed between the outer and inner races 52, 54 and into the raceways 66, 68. For example, as shown in FIG. 4, the outer race 52 includes two ball plugs 48 (i.e. one for each row of roller elements 56). As such, the ball plug(s) 48 can be removed and the roller elements 56 can be inserted through the outer race 52 into one of the raceways 66, 68. Further, as shown in the illustrated embodiment, the ball plugs 48 may be arranged side-by-side. In alternative embodiments, the ball plugs 48 may be offset from each other. In addition, as shown particularly in FIG. 6, each raceway 66, 68 may be defined by separate walls of the outer and inner races 52, 54. For instance, as shown, the first raceway 66 is defined by a first outer raceway wall of the outer race 52 and a first inner raceway wall of the inner race 54. Similarly, the second raceway 68 is defined by a second outer raceway wall of the outer race 54 and a second inner raceway wall of the inner race 54.

As such, the inner race 54 may be configured to rotate relative to the outer race 52 (via the roller elements 56) to allow the pitch angle of each rotor blade 22 to be adjusted.

As mentioned, relative rotation of the outer and inner races 52, 54 may be achieved using a pitch adjustment mechanism 38 mounted within a portion of the hub 20. In general, the pitch adjustment mechanism 38 may include any suitable components and may have any suitable configuration that allows the mechanism 38 to function as described herein. For example, as shown in FIG. 2, the pitch adjustment mechanism 38 may include a pitch drive motor 58 (e.g., an electric motor), a pitch drive gearbox 60, and a pitch drive pinion 62. In such an embodiment, the pitch drive motor 58 may be coupled to the pitch drive gearbox 60 so that the motor 58 imparts mechanical force to the gearbox 60. Similarly, the gearbox 60 may be coupled to the pitch drive pinion 62 for rotation therewith. The pinion 62 may, in turn, be in rotational engagement with the inner race 54. For example, as shown in FIG. 4, a plurality of gear teeth 64 may be formed along the inner circumference of the inner race 54, with the gear teeth 64 being configured to mesh with corresponding gear teeth formed on the pinion 62. Thus, due to meshing of the gear teeth 64 rotation of the pitch drive pinion 62 results in rotation of the inner race 54 relative to the outer race 52 and, thus, rotation of the rotor blade 22 relative to the hub 20.

Referring now to FIGS. 7 and 8, various cross-sectional views of the ball plug 48 according to the present disclosure are illustrated. As shown, the ball plug 48 is received within a radial opening 53 defined within the outer race 52. It should be understood that the ball plug 48/radial opening 53 may also be positioned in the inner race 54 (or both). Further, as shown in FIG. 7, the radial opening 53 may have a tapering diameter (i.e. the diameter gradually changes over a certain length). Alternatively, as shown in FIG. 8, the radial opening 53 may have a varying diameter (i.e. the diameter changes abruptly via a step change).

More specifically, as shown in FIGS. 7 and 8, the ball plug 48 includes an outer portion 55 and an inner portion 57. Moreover, as shown, the outer portion 55 defines a first diameter 59 and the second portion defines a second diameter 61. For example, as shown, the first diameter 59 is larger than the second diameter 61. In addition, as shown in the embodiment of FIG. 7, the ball plug 48 also includes a transitional region 63 between the outer and inner portions 55, 57. Thus, as shown particularly in FIG. 7, the transitional region 63 of the ball plug(s) 48 has a tapered cross-section that matches the tapering diameter of the radial opening 53. More specifically, as shown, the first diameter 59 of the outer portion 55 tapers to the second diameter 61 of the inner portion 57 within the transitional region 63. In addition, as shown, the inner portion 57 of the ball plug 48 may include a partial raceway 76 that defines a portion of at least one raceway 66, 68 of either the outer or inner races 50, 52. Alternatively, as shown in FIG. 8, the first diameter 59 of the outer portion 55 jumps to the second diameter 61 of the inner portion 57 abruptly at step 78.

Referring still to FIGS. 7 and 8, the bearing assembly 50 may also include exterior retention means 65 arranged at or adjacent to a distal-most end of the outer portion 55 of the ball plug 48. For example, the exterior retention means 65 may include a circlip, snap ring, a clamp, bonding means, or similar. More particularly, in the embodiment of FIG. 7, the exterior retention means 65 may be a snap ring. In certain embodiments, the bonding means may include, for example, welding, adhesives, or chemical-based solvents. In such embodiments, the ball plug 48 may be retained, for example, by bonding the outer portion 55 of the ball plug 48 within the radial opening 53. Alternatively, as shown in FIG. 8, the exterior retention means 65 may include a mechanical device such as a locknut or a retention plate combined with one or more mechanical fasteners 80 that engage with the locknut or the retention plate and extend parallel with the longitudinal axis 69 of the ball plug 48.

In additional embodiments, as shown in FIGS. 7 and 8, the bearing assembly 50 may include an anti-rotation device 70 configured to prevent rotation of the ball plug 48. More specifically, as shown in FIG. 7, the anti-rotation device 70 may extend generally perpendicular to a longitudinal axis 69 of the ball plug 48 and may also engage an outer surface of the transitional region 63 of the ball plug 48. Alternatively, as shown in FIG. 8, may extend generally parallel to the longitudinal axis 69 of the ball plug 48. It should be understood that the anti-rotation device may include, for example, an anti-rotation pin (e.g. optionally tapered) or an anti-rotation fastener.

Still referring to FIGS. 7 and 8, the bearing assembly 50 may include one or more O-rings 72 arranged circumferentially around the inner portion 57 of the ball plug 48. For example, as shown particularly in FIG. 7, the inner portion 57 of the ball plug 48 may include at least one annular recess 74, with one or more O-rings 72 being arranged within the annular recess 74. In addition, as shown, the bearing assembly 50 may include a plurality of O-rings 72 arranged circumferentially around the inner portion 57 of the ball plug 48 within the annular recess 74. In such embodiments, as shown, the O-rings 72 may be aligned in a longitudinal direction (i.e. along the longitudinal axis 69) of the ball plug 48. Alternatively, as shown in FIG. 8, the bearing assembly 50 may include a single O-ring arranged on the outer surface of the inner portion 57 of the ball plug 48.

In addition, as shown in the embodiment of FIG. 7, the bearing assembly 50 may also include a spacer 67 or shim positioned between the exterior retention device 65 and the distal-most end of the outer portion 55 of the ball plug 48.

Referring now to FIGS. 9 and 10, the bearing assembly 50 may also include a set of ball plugs 48 positioned within adjacent radial openings 53 such that the outer portions 55 thereof contact each other. For example, as shown, the adjacent ball plugs 48 are stacked such that the anti-rotation device 70 described in FIGS. 7 and 8 can be eliminated in such an embodiment.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a wind turbine, comprising;
a bearing comprising an outer race, an inner race rotatable relative to the outer race, and a plurality of ball bearings positioned within at least one raceway defined between the outer and inner races, at least one of the outer race or the inner race defining a radial opening;
at least one ball bearing plug positioned within the radial opening of at least one of the outer race or the inner race, the at least one ball bearing plug comprising an outer portion and an inner portion, the at least one ball bearing plug being removable such that the plurality of ball bearings can be inserted between the outer and inner races, at least a portion of the at least one ball bearing plug comprising a tapered cross-section, the tapered cross-section is positioned between the outer portion and the inner portion of the at least one ball bearing plug so as to define a transitional region thereof; and an exterior retention device arranged exterior to a distal-most end of the outer portion of the at least one ball bearing plug, a plurality of O-rings arranged circumferentially around the inner portion of the at least one ball bearing plug within at least one annular recess of the inner portion, the plurality of O-rings being aligned in a longitudinal direction of the at least one ball bearing plug.

2. The bearing assembly of claim 1, wherein the outer portion defines a first diameter and the inner portion defines a second diameter, the first diameter tapering to the second diameter in the transitional region.

3. The bearing assembly of claim 1, further comprising at least one spacer or shim positioned between the exterior retention means and the distal-most end of the obiter portion of the at least one ball bearing plug.

4. The bearing assembly of claim 1, wherein the inner portion of the at least one ball bearing plug comprises a partial raceway that defines a portion of at least one raceway of at least one of the outer race or the inner race.

5. The bearing assembly of claim 1, wherein the bearing comprises at least one of a pitch bearing or a yaw bearing of a wind turbine.

6. A bearing assembly for a wind turbine, comprising;
a bearing comprising an outer race, an inner race rotatable relative to the outer race, and a plurality of ball bearings positioned within at least one raceway defined between the outer and inner races, at least one of the outer race or the inner race defining a radial opening, the radial opening comprising a tapering diameter;

at least one ball bearing plug comprising an outer portion and an inner portion, the outer portion defining a first diameter, the inner portion defining a second diameter, the first diameter being larger than the second diameter, the at least one ball bearing plug positioned within the radial opening of at least one of the outer race or the inner race, the at least one ball bearing plug being removable such that the plurality of ball bearings can be inserted between the outer and inner races, the inner portion of the at least one ball bearing plug comprising at least one annular recess; and a plurality of O-rings arranged circumferentially around the inner portion of the at least one ball bearing plug within the at least one annular recess, the plurality of O-rings being aligned in a longitudinal direction of the at least one ball bearing plug.

7. The bearing assembly of claim 6, wherein the at least one ball bearing plug comprises a varying cross-section that substantially corresponds to the tapering diameter of the radial opening, the varying cross-section located between the outer and inner portions of the at least one ball bearing plug.

8. The bearing assembly of claim 6, further comprising an exterior retention device arranged adjacent to a distal-most end of the outer portion of the at least one ball bearing plug, the exterior retention device comprising at least one of a locknut or a retention plate and one or more mechanical fasteners that engage with the at least one of the locknut or the retention plate and extend parallel with a longitudinal axis of the at least one ball beating plug.

9. The bearing assembly of claim 6, further comprising an anti-rotation device engaging an outer surface of the outer portion of the at least one ball bearing plug so as to prevent rotation thereof.

10. A bearing assembly for a wind turbine, comprising;
a bearing comprising an outer race, an inner race rotatable relative to the outer race, and a plurality of ball bearings positioned within at least one raceway defined between the outer and inner races, at least one of the outer race or the inner race defining a set of radial openings; and, a set of ball bearing plugs each comprising an outer portion and an inner portion, the outer portion defining a first diameter, the inner portion defining a second diameter, the first diameter being larger than the second diameter, each of the ball bearing plugs positioned within one of the radial openings such that the outer portions thereof contact and abut against each other, the set of ball bearing plugs being removable such that the plurality of ball bearings can be inserted between the outer and inner races.

* * * * *